(12) United States Patent
Meadows et al.

(10) Patent No.: US 11,319,124 B2
(45) Date of Patent: May 3, 2022

(54) BEVERAGE FILTRATION DEVICE

(71) Applicant: Purewine, Inc., Grapevine, TX (US)

(72) Inventors: David L. Meadows, Colleyville, TX (US); Derek B. Meadows, Colleyville, TX (US)

(73) Assignee: Purewine Inc., Grapevine, TX (US)

( * ) Notice: Subject to any disclaimer, the term of this patent is extended or adjusted under 35 U.S.C. 154(b) by 0 days.

(21) Appl. No.: 16/976,910

(22) PCT Filed: Mar. 8, 2019

(86) PCT No.: PCT/US2019/021351
§ 371 (c)(1),
(2) Date: Aug. 31, 2020

(87) PCT Pub. No.: WO2019/173713
PCT Pub. Date: Sep. 12, 2019

(65) Prior Publication Data
US 2021/0047093 A1 Feb. 18, 2021

Related U.S. Application Data

(60) Provisional application No. 62/640,371, filed on Mar. 8, 2018.

(51) Int. Cl.
*B67D 7/76* (2010.01)
*B67D 3/00* (2006.01)
(Continued)

(52) U.S. Cl.
CPC ........... *B65D 51/28* (2013.01); *B01D 15/361* (2013.01); *B65D 51/1633* (2013.01);
(Continued)

(58) Field of Classification Search
CPC ............ B01D 15/361; B01F 2215/0072; B01J 47/012; B65D 25/38; B65D 25/48;
(Continued)

(56) References Cited

U.S. PATENT DOCUMENTS 690,457 A * 1/1902 Smith ..................... C02F 1/003
210/244
772,707 A * 10/1904 Elfstrand ............... B65D 47/18
222/421

(Continued)

FOREIGN PATENT DOCUMENTS

WO 2019173713 A1 9/2019

*Primary Examiner* — Gideon R Weinerth

(57) ABSTRACT

Beverage filtration device including a lid body having an internal housing configured to hold an ion exchange resin-filed cartridge therein having a connection end and a top end having an opening therein, and, stem body having a cap region, collar, beverage conduit and stem air tube. The cap region couples to the connection end of the lid body to form a liquid-tight seal coupling there-between. A collar wall first portion fits inside a beverage mouth container and a second portion located outside of the mouth. The beverage conduit spans the collar, a first conduit opening open to the coupling between the cap region and the connection end and a second conduit open to a container interior. The stem body air tube extends through the collar, a proximal opening of the stem body air tube opens to an air vent hole located in the second portion of the collar wall, and, a distal opening of the stem body air tube opens to the container interior.

23 Claims, 14 Drawing Sheets

(51) Int. Cl.
| | |
|---|---|
| *B65D 47/06* | (2006.01) |
| *B65D 23/06* | (2006.01) |
| *B01D 15/36* | (2006.01) |
| *B65D 35/38* | (2006.01) |
| *B65D 51/28* | (2006.01) |
| *B65D 51/16* | (2006.01) |
| *C12H 1/04* | (2006.01) |
| *B65D 47/32* | (2006.01) |
| *B01F 101/17* | (2022.01) |

(52) U.S. Cl.
CPC ........ *C12H 1/0432* (2013.01); *B01F 2101/17* (2022.01); *B65D 47/06* (2013.01); *B65D 47/32* (2013.01); *C02F 2307/02* (2013.01)

(58) Field of Classification Search
CPC ........ B65D 47/06; B65D 47/08; B65D 47/32; B65D 2547/063; B65D 51/28; B65D 51/1633; B65D 51/1616; C02F 1/002; C02F 1/003; C02F 9/005; C02F 2307/02; C02F 2307/04; C12H 1/0432
USPC .......... 222/482, 500; 210/244, 282, 95, 317, 210/449, 460, 464; 261/76
See application file for complete search history.

(56) References Cited

U.S. PATENT DOCUMENTS

| | | | | | |
|---|---|---|---|---|---|
| 1,428,297 | A | * | 9/1922 | Price | B65D 47/06 222/478 |
| 2,096,585 | A | * | 10/1937 | Hoeter | B65D 47/06 222/479 |
| 2,286,906 | A | * | 6/1942 | Gaines | B65D 47/06 222/482 |
| 2,525,497 | A | * | 10/1950 | Monfried | B01J 47/022 210/290 |
| 2,727,644 | A | * | 12/1955 | Giannos | B65D 47/06 222/478 |
| 2,761,833 | A | * | 9/1956 | Ward | C02F 1/003 210/85 |
| 2,825,495 | A | * | 3/1958 | Fazio | B65D 47/06 222/478 |
| 2,968,423 | A | * | 1/1961 | Mahler | G01F 11/265 222/49 |
| 3,139,224 | A | * | 6/1964 | Bloom | B65D 47/065 222/478 |
| 3,335,917 | A | * | 8/1967 | Knight | B01D 35/027 222/189.07 |
| 3,782,549 | A | * | 1/1974 | Muller | E03C 1/084 210/95 |
| 3,782,610 | A | * | 1/1974 | Gilbert | B65D 47/263 222/484 |
| 3,966,099 | A | * | 6/1976 | Sanford, Jr. | B67D 3/00 222/478 |
| 4,156,026 | A | * | 5/1979 | Gogel | C12H 1/0432 426/15 |
| 4,595,121 | A | | 6/1986 | Schultz | |
| 4,775,541 | A | * | 10/1988 | Brown | C12H 1/0432 210/670 |
| 4,792,454 | A | * | 12/1988 | Lemonnier | C12G 1/064 426/112 |
| 4,852,781 | A | * | 8/1989 | Shurnick | A45F 3/16 224/148.2 |
| 4,986,901 | A | * | 1/1991 | Nohren, Jr. | B01D 35/143 210/232 |
| 5,211,318 | A | * | 5/1993 | Govatzidakis | B65D 47/06 222/479 |
| 5,601,217 | A | * | 2/1997 | Wagner | B67D 3/0045 222/481.5 |
| 5,799,836 | A | * | 9/1998 | Lee | B65D 47/06 222/189.07 |
| 5,964,382 | A | * | 10/1999 | Randal | B65D 51/1611 222/478 |
| 6,230,944 | B1 | * | 5/2001 | Castellano | B65D 47/243 222/481.5 |
| 6,395,170 | B1 | * | 5/2002 | Hughes | B01D 35/02 210/232 |
| 6,609,639 | B1 | * | 8/2003 | Genthon | B65D 23/065 222/567 |
| 7,407,067 | B2 | * | 8/2008 | Kerkhof | B65D 23/065 222/109 |
| 7,810,651 | B2 | * | 10/2010 | Miga, Jr. | C02F 1/002 210/466 |
| D633,753 | S | * | 3/2011 | White | B01F 3/04787 D7/398 |
| 7,993,518 | B2 | * | 8/2011 | Shani | B01D 61/18 210/236 |
| 8,205,541 | B2 | * | 6/2012 | Barberio | B01F 5/0682 99/277.1 |
| 8,251,352 | B2 | * | 8/2012 | Chiorazzi | B01F 5/0428 261/76 |
| 8,365,964 | B2 | * | 2/2013 | Federighi | B65D 47/06 222/190 |
| 8,517,350 | B2 | * | 8/2013 | Tsai | B01F 13/002 261/76 |
| 8,657,157 | B2 | * | 2/2014 | Blinn | B65D 51/1611 222/1 |
| 9,033,187 | B2 | * | 5/2015 | Luebke | B01F 3/0446 222/190 |
| 9,394,089 | B2 | * | 7/2016 | Silvers | B65D 47/06 |
| 9,486,754 | B2 | * | 11/2016 | Foldesi, Jr. | B01F 3/0446 |
| 9,802,164 | B2 | * | 10/2017 | Min | B01F 3/04787 |
| 9,944,442 | B2 | * | 4/2018 | Carsello | B65D 51/244 |
| 10,220,357 | B1 | * | 3/2019 | Hsueh | B01F 7/00916 |
| 10,500,552 | B1 | * | 12/2019 | Liu | B01F 3/04794 |
| 2002/0036176 | A1 | * | 3/2002 | Hughes | C02F 1/003 210/767 |
| 2005/0184026 | A1 | | 8/2005 | Haley | |
| 2008/0282908 | A1 | | 11/2008 | Cole et al. | |
| 2012/0074172 | A1 | | 3/2012 | Federighi | |
| 2012/0085790 | A1 | | 4/2012 | Agassi et al. | |
| 2012/0111893 | A1 | * | 5/2012 | Luebke | B65D 47/32 222/190 |
| 2012/0156345 | A1 | * | 6/2012 | Agarwal | B01F 5/0428 426/474 |
| 2012/0272831 | A1 | | 11/2012 | Barberio et al. | |
| 2013/0153685 | A1 | | 6/2013 | Drobot et al. | |
| 2013/0202757 | A1 | | 8/2013 | Hawkins | |
| 2014/0144329 | A1 | * | 5/2014 | Chiu | C12H 1/063 99/277.1 |
| 2014/0252662 | A1 | * | 9/2014 | Graham | B01F 3/04794 261/76 |
| 2014/0260997 | A1 | | 9/2014 | Henderson | |
| 2015/0259186 | A1 | | 9/2015 | Haley et al. | |
| 2015/0307265 | A1 | * | 10/2015 | Winn | B65D 47/065 426/66 |
| 2017/0240853 | A1 | | 8/2017 | Meadows et al. | |
| 2017/0355939 | A1 | | 12/2017 | Yadav | |
| 2019/0292502 | A1 | * | 9/2019 | Leverich | B01D 24/10 |

* cited by examiner

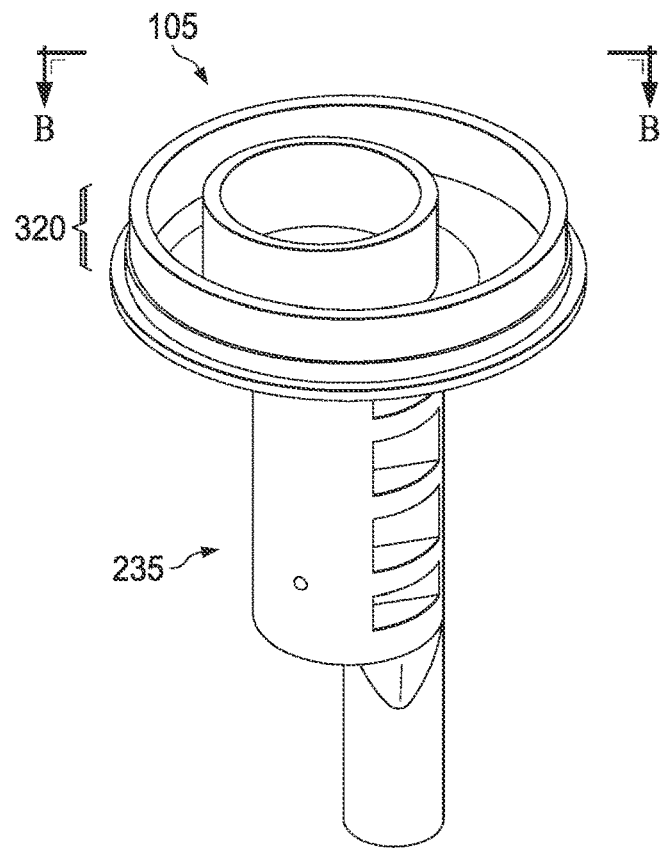
FIG. 8A
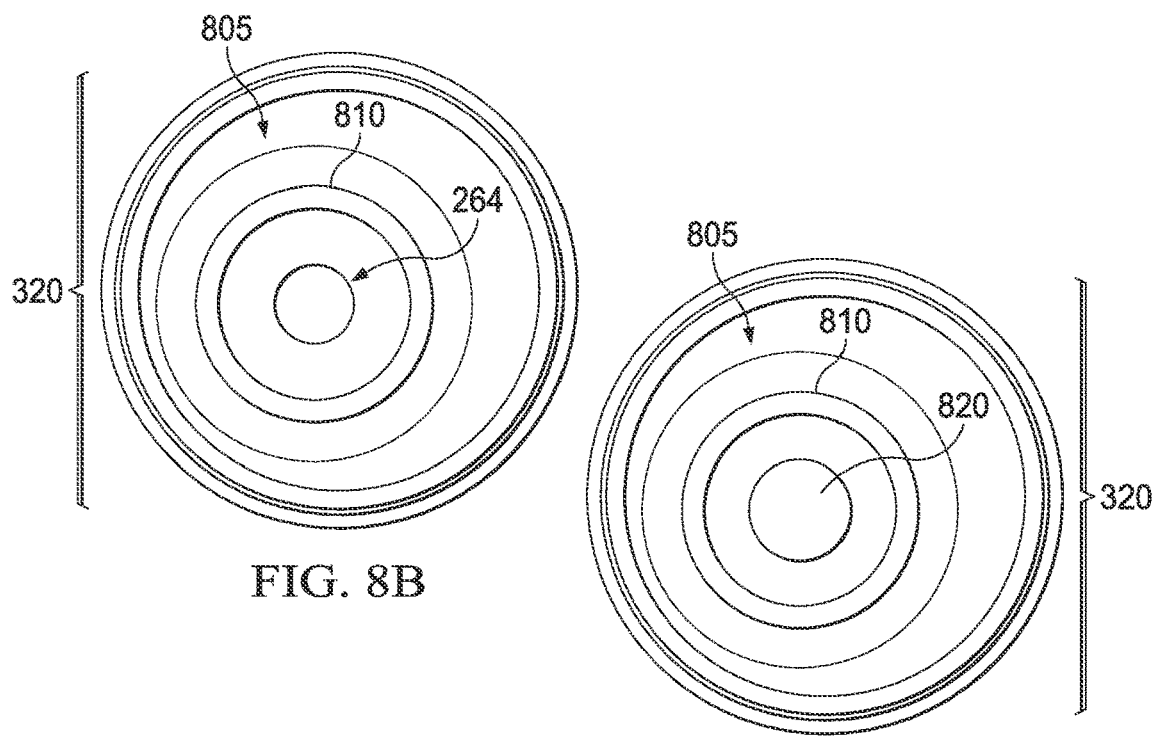
FIG. 8B
FIG. 8C

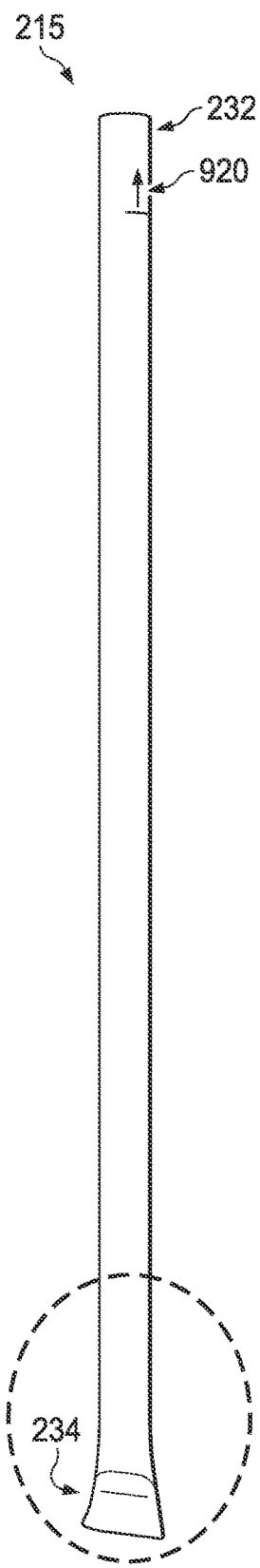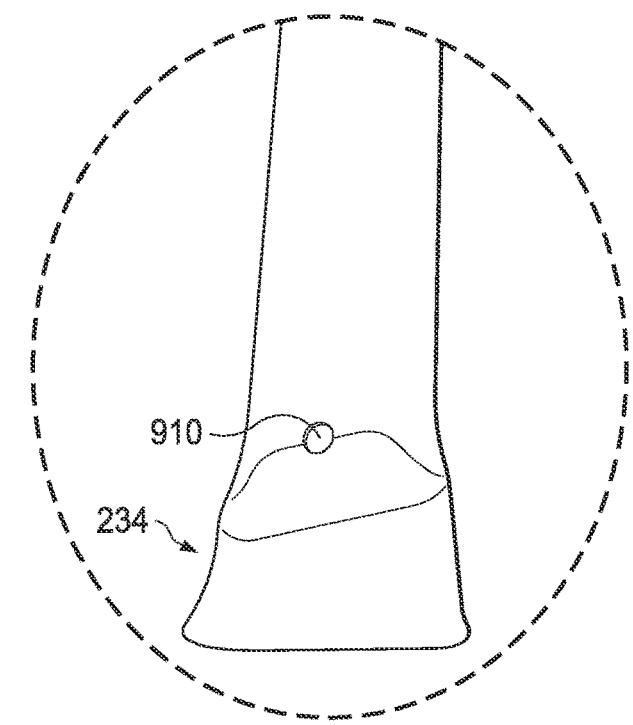
FIG. 9A
FIG. 9B

BEVERAGE FILTRATION DEVICE

CROSS-REFERENCE TO RELATED APPLICATION

This application is the National Stage of, and therefore claims the benefit of, International Application No. PCT/US2019/021351 filed on Mar. 8, 2019, entitled "A BEVERAGE FILTRATION DEVICE," which was published in English under International Publication Number WO 2019/173713 on Sep. 12, 2019, which claims priority to U.S. Provisional Application Ser. No. 62/640,371 filed Mar. 8, 2018, all of which are commonly assigned with the present application and are incorporated herein by reference in their entirety.

TECHNICAL FIELD

This application is directed, in general, to the treatment of beverages, more specifically, to a filtration device to treat alcoholic beverages to remove noxious elements in the beverage

BACKGROUND

Large segments of the population, consuming alcoholic beverages can experience negative symptoms (e.g., headaches, congestion and flushing) associated with the presence of certain noxious elements in the beverage, such as preservatives, biogenic amines and oxidized components. What is needed in the art is a simplified consumer-friendly treatment of beverages to remove such elements from alcoholic beverages sold in commercially available containers.

SUMMARY

A beverage filtration device including a lid body and a stem body. The lid body has an internal housing configured to hold an ion exchange resin-filed cartridge therein, the lid body having a connection end and a top end having an opening therein. The stem body includes a cap region, collar, beverage conduit and stem air tube. The cap region is configured to couple to the connection end of the lid body to form a liquid-tight seal coupling there-between. A first portion of a wall of the collar is sized to fit inside a mouth of a beverage container and a second portion of the wall is sized to be located outside of the mouth. The beverage conduit spans the collar, where a first opening of the conduit opens to the coupling between the cap region and the connection end and a second opening of the conduit opens to an interior of the beverage container. The stem body air tube extends through the collar, where a proximal opening of the stem body air tube opens to an air vent hole located in the second portion of the wall of the collar, and, a distal opening of the stem body air tube opens to the interior of the beverage container.

BRIEF DESCRIPTION

Reference is now made to the following descriptions taken in conjunction with the accompanying drawings, in which:

FIG. 8A shows a right side upper perspective photograph of the example stem body shown in FIG. 6A;

FIGS. 8B and 8C show a top down photographs of the stem body shown along view line B-B in FIG. 8A;

FIG. 9A shows a photography of an example air tube extender embodiment of the device;

FIG. 9B shows a detailed view of a distil end of the air tube extender shown in FIG. 9A.

DETAILED DESCRIPTION

Figure 1A:
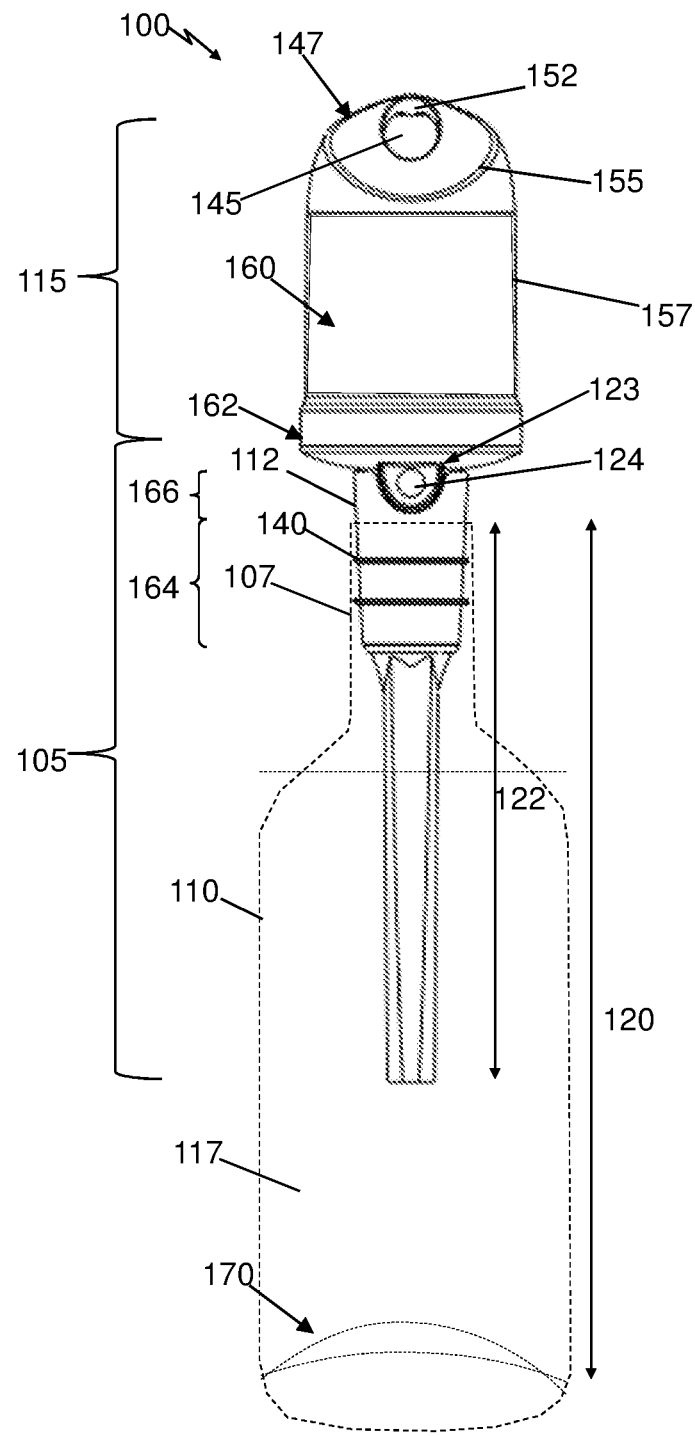
FIG. 1A shows a front side view of an example embodiment of the beverage filtration device.

We have developed ion exchange resins (hereinafter "resins") to treat beverages to remove noxious elements from the beverage such as preservatives, biogenic amines and oxidized components. Non-limiting example suitable resin materials are disclosed in U.S. Pat. No. 9,670,442 ("Treatment of beverages to reduce the effects of noxious constituents" to Meadows et al. "Meadows") which is incorporated by reference in its entirety herein.

The problem remains, however, of how to use these resins to rapidly and efficiently remove noxious elements from beverages held in a bottle or other commercial containers normally used to hold alcoholic beverages. Disclosed herein is a filtration device designed to remove these elements by filtering the beverage through the resin contained in the device, as the beverage is being poured out of its holding container. The filtration device includes a combination of components that work together to enable the noxious elements to be removed without spilling the beverage and without an excessively slow pouring time.

FIGS. 1A-5B illustrates various aspects of example embodiments of a beverage filtration device 100 as further explained below.

With continuing reference to FIGS. 1A-5B, throughout, embodiments of the filtration device 100 can include: a stem body 105 which is insertable into the mouth 107 of a beverage container 110 (e.g., an alcohol-containing beverage container) via a stopper module 112, a lid body 115 housing an ion exchange resin-filed cartridge 210 therein and an air tube extender 215.

The filtration device 100 is configured such that the flow of the beverage 117 through the cartridge 210 is not too fast as to limit its filtering function and not too slow as to dissuade its use in a consumer environment (e.g., at home or in a restaurant or bar). The flow of the beverage 117 allows the residence time of the beverage 117 to be sufficiently long enough (e.g., about 5 to 30 sec) to remove appropriate amounts of the undesired components (e.g., at least about 25% of preservatives, biogenic amines and oxidized components) in the beverage 117. Additionally, the flow through the cartridge 210 should not be so slow that it takes longer than the desired amount of time to pour a glass, or other consumption container, of the beverage. For example, in some embodiments, the filtration device 100 is configured such that the flow of beverage 117 though the device 100 can be in a range from 5 ml/s to 30 ml/s.

Because a vacuum can be formed in the beverage container 110 when the beverage 117 is being poured, the air tube extender 215 can be provided to allow air outside the container 110 to vent into the container 110 and thereby allow for continuous beverage delivery. The air tube extender 215 can be adjusted to have a length 220 so the hydrostatic head pressure from the beverage provides sufficient flow of the beverage through the cartridge. Additionally, the air tube extender 215 can be configured to be not so long that it will not allow the device 100 to be inserted into the beverage container. For example, in some embodiments, when the container 110 has a length 120 of 1.0 arbitrary length units (alu), and the portion of the stem body 105 inside the container has a length 122 in a range from about 0.2 to 0.6 alu, then the air tube extender 215 can have a length 220 in a range from about 0.7 to 0.3 alu.

The diameter 225 of the air tube extender 215 is configured to be large enough to allow an adequate volume of air to vent through the tube while pouring the beverage. But the inner diameter 225 is not so large as to allow the beverage to flow through the air tube and exit the vent hole 124 thereby creating a spillage of beverage. For example, in some embodiments, the air tube extender 215 can have a diameter 225 in a range from 0.15 inches to 0.30 inches. In some embodiments, the proximal end of the vent hole 124 is configured to have a reservoir 227 of sufficient size to accumulate any beverage that leaks down the air tube extender 215. In some embodiments, the housing 123 defining the vent hole 124 and reservoir 227 can have an igloo shape. In some embodiments, to facilitate providing the desired reservoir 227 volume, the housing 123 can have a channel length 237 in a range from about 0.3 to 0.4 inches.

Some embodiments of the stem body 105 can include a stem body air tube extender 230 having a distal end opening 231 configured to fit an end portion 232 of the air tube extender 215. The air tube extender 215 can be detachably connected to the stem body air tube extender 230 end opening 231 to facilitate providing a more compact length for packaging the device 100. The air tube extender 215 can be inserted into the opening in the distal end opening 231 of the stem body air tube extender 230 before the device 100 is inserted into the beverage container 110. In some embodiments, the stem body 105 can include a stop structure 233 near the distal end opening 231 (e.g., within about 0.4 to 0.6 inches from the distal end opening 231, in some embodiments). The stop structure 233 can be configured to prevent the air tube extender 215 from being inserted too deeply into the stem body 105. The air tube extender 215 is configured to fit into the stem body air tube extender's 230 distill end opening 231 tight enough to prevent leakage of air or beverage at the joint between the extender 215 and the distill end 231 opening. The air tube extender 215 can be provided with a length 220 adequate to fit a particular beverage container 110 or range of beverage containers (e.g., upon trimming away portions of the tube from the distal end 234 of the air tube extender 215 to fit inside the container). In some embodiments, the distal end 234 of the air tube extender 215 can be tapered to prevent closure of the distal opening 234 if it comes in contact with the bottom of the beverage container 110.

The stopper module 112 is configured to attach around a collar 235 of the device stem body 105. The stopper module 112 can include or be composed of a material (e.g. silicone rubber) that is pliable (e.g., durameter range of about 40 to 60 Shore units) so as to attach and be firmly held in place around the collar 235 of the device stem body 105. Embodiments of stopper module 112 can include one or more ribs 140 encircling the stopper module 112. The ribs 140 help to form a tight seal between the mouth 107 of the beverage container 110 and the device 100 when the device is inserted into the beverage container. Embodiments of the stopper module 112 can have a smaller diameter 410 at the lower end and larger diameter 420 at the upper end of the stopper module to facilitate the stopper module to fit into a wide range of containers 110 with varying sizes of mouths 107.

Embodiments of the stem body 105 of the device 110 can have a rim 310 that is insertable into a ridge section 510 of the lid body 115 such that the rim 310 abuts against an interior lip 512. This insertion zone 320 is configured such that a tight seal can be formed between the rim 310 of the stem body and ridge section 510 of the lid body using technologies such as ultrasonic welding, heat welding or food grade adhesives such as silicone or epoxy. In other embodiments, the seal between the stem body and lid body can be formed using a compression snap fit, a gasket o-ring seal or a threaded connection (represented generally 330), or combinations thereof.

In some embodiments, the cap region 240 of the stem body 105 has a concave cupped shape such that a reservoir 245 is formed between the top 250 of the stem body 105 and the filter cartridge 210 to thereby facilitate the beverage being evenly distributed over the cartridge and avoid channeling of beverage through the cartridge during the filtration process.

The lid body 115 is configured to house the cartridge 210 therein and to facilitate delivery of the beverage 117 from the container 110 holding the beverage into another container for consumption. The interior of the lid body 115 has a ridge section 510 serving as ledge (e.g., via lip 512) for the cartridge 210 to contact and form a seal with such that the beverage does not bypass the cartridge during the filtration process.

The opening 145 in the top 147 of the lid body 115 is shaped and located to facilitate the beverage 117 being delivered into a consumption container without spillage or dripping. In some embodiments, to facilitate spill-free pouring, the opening 145 has an elliptical shape and the major axis of the ellipse 505 parallel to the direction 507 that the beverage is poured out of through the device 100. However in other embodiments, the opening 145 can have a circular, square, wedge, triangular or other shapes.

In some embodiments, the location of the lid opening 145 is about 180 degrees (e.g., in a range from 170 to 190 degrees in some embodiments) opposite to the location of the air vent opening 124 in the stem body 105. This configuration facilitates having the air vent opening 124 being oriented vertically when the beverage is being tilted to pour and filter the beverage into the consumption container, to help prevent beverage from draining down the air vent opening 124 thereby causing spillage. In some embodiments, alignment tabs 148, 149 (e.g., raised features or indentations in various embodiments) on the stem body 105 and lid body 115 can facilitate adjusting the relative orientations of the stem body and lid body so as to provide the desired about 180 degree orientation angle 150 (e.g., 180±10, or ±5 or ±1 degrees) between the lid opening 145 and air vent opening 124 to be achieved.

In some embodiments, the lid opening 145 includes a lip 152 located on a portion of an outer perimeter 155 of the lid top 147 housing the opening 145. The lip 152 can facilitate providing a clean, drip-free delivery of the beverage to the consumption container such that, e.g., drops of the beverage do not form and run down the sides 157 of the lid body 115 when the device is turned upright after the pour is completed. In some embodiments, the lip 152 can overlay about 1 to 20 percent of the total length of the lid top's 147 perimeter 155.

The cartridge's 210 size is designed to contain adequate resin to filter the desired amount of beverage and remove adequate amounts of undesired elements. In some embodiments, for example, for a 1 unit volume of beverage in a container the volume of resin in the cartridge can be in a range from 0.02 to 0.07 volume units. Non-limiting example suitable resin materials for inclusion in the cartridge are disclosed in Meadows. In some embodiments additional compounds can be included in the cartridge 210 for delivery to the beverage. Non-limiting examples include vitamins, flavor ingredients, nutraceuticals, etc.

The barrel wall 251 of the filter cartridge 210 can include or be composed of a solid material and the ends 252, 254 of the cartridge 210 are open with flanges 256 on each end. The flanges 256 facilitate the coupling of a filter fabric 257 to be sealed (e.g., using heat sealing or food grade adhesive sealants such as silicone or epoxy) to the ends 252, 254 of the barrel wall 251 and thereby contain the resin in the filter cartridge 210. The mesh size of the filter fabric to prevent the resin particles from leaking through, but still large enough to allow for easy flow of the beverage through the cartridge. For example in some embodiments, the mesh size is in a range from about 5 microns to 100 microns.

The cartridge 210, stem body 105 and lid body 115 and their component parts can be fabricated from a wide range of plastic or metal materials with various finishes and textures. Non-limiting example plastic materials include polypropylene, polyethylene, ABS, polycarbonate, or plexiglass. Such materials can include compatible colorant or surface coatings such as chrome, copper, silver, gold, titanium. In some embodiments these device components can be include or be composed of a range of renewable or biodegradable materials. In some embodiments these components can include or be composed of metal materials can be aluminum, brass, stainless steel, or composites.

One embodiment of the device 100 includes a stem body 105 and a lid body 115 having an internal housing 160 configured to hold an ion exchange resin-filed cartridge 210 therein, the lid body 115 having a connection end 162 and a top end 147 having an opening 145 therein.

The stem body 105 includes a cap region 240, a collar 235, a beverage conduit 262 and a stem body air tube 230. The cap region 240 is configured to couple to the connection end 162 of the lid body 115 to form a liquid-tight seal there-between. At least a first portion 164 of a wall 260 of the collar 235 is sized to fit inside a mouth 107 of a beverage container 110 and a second portion 166 of the wall 260 sized to be located outside of the mouth 164. The beverage conduit 262 spans the collar 235, where a first opening 264 of the conduit 262 opens to the coupling between the cap region 240 and the connection end 162, and, a second opening 266 of the conduit 262 opens to an interior of the beverage container 110 (e.g., such that the beverage 117 can flow through the openings 264, 266 through the cartridge 210 and opening 145 at the desired flow rate). The stem body air tube 230 extending through the collar 235, where a proximal opening 270 of the stem body air tube 230 opens to an air vent hole 124 located in the second portion 166 of the wall 260 of the collar 235, and, a distal opening 231 of the stem body air tube 230 opens to the interior of the beverage container 110.

In some embodiments of the device 100 the coupling between the cap region 240 of the stem body 105 and the connection end 162 of the lid body 115 form a reservoir 245 therebetween. In some such embodiments, the cap region 240 of the stem body 105 has a concave cupped shape interior surface 275 defining a portion the reservoir 245. Additionally or alternatively, in some such embodiments, the cap region 240 of the stem body 105 is rotationally adjustable relative to the connection end 162 of the lid body 115 such that an orientation of the lid opening 145 of the lid body 115 relative to an air vent opening 124 of the stem body 105 is adjustable. In some such embodiments, the stem body 105 and the lid body 115 each have alignment tabs 148, 149 and when the tabs 148, 149 are aligned with each other, an orientation of the lid opening 145 of the lid body 115 relative to an air vent opening 124 has an orientation angle 150 of about 180 degrees. For instance, in some embodiments, there can be one or more tabs 149 on the side 157 of lid body 115 and one or more tabs 148 on the collar 235 or on the stopper module 112 when present.

Embodiments of the device 100 can further include an air tube extender 215 configured to be detachably connectable to the stem body air tube 230. In some such embodiments, for a container 110 having an length 120 of 1 arbitrary length unit, a portion of the stem body 105 inside the container 110 (e.g., the first portion 164 of the wall 260 and a lower portion of the stem body air tube 230, in or below the mouth 107) has a length 122 in a range from about 0.2 to 0.6 arbitrary length units and the air tube extender 215 has a length 220 in a range from about 0.7 to 0.3 arbitrary length units, respectively. In some such embodiments, the distal end 234 of the air tube 215 is more distal from the lid body 115 than the second opening 266 of the beverage conduit 262. E.g., the distal end 234 of the air tube extender 215 extends farther into the beverage container 110 than the second opening 266 of the beverage conduit 262.

For any such device 100 embodiments, the collar 235 can be sized such that the wall 260 portion 164 that fits inside of the container's mouth 107 directly forms a liquid seal to the mouth 107.

Figure 4A:
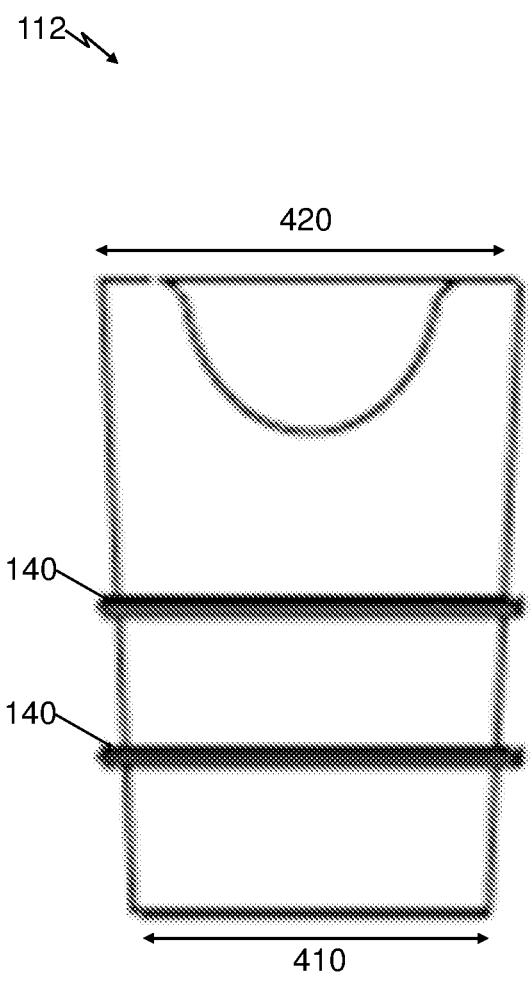
FIG. 4A shows a detailed front side view of a stopper module of stem body of the example embodiment shown in FIG. 1A.
Figure 4B:
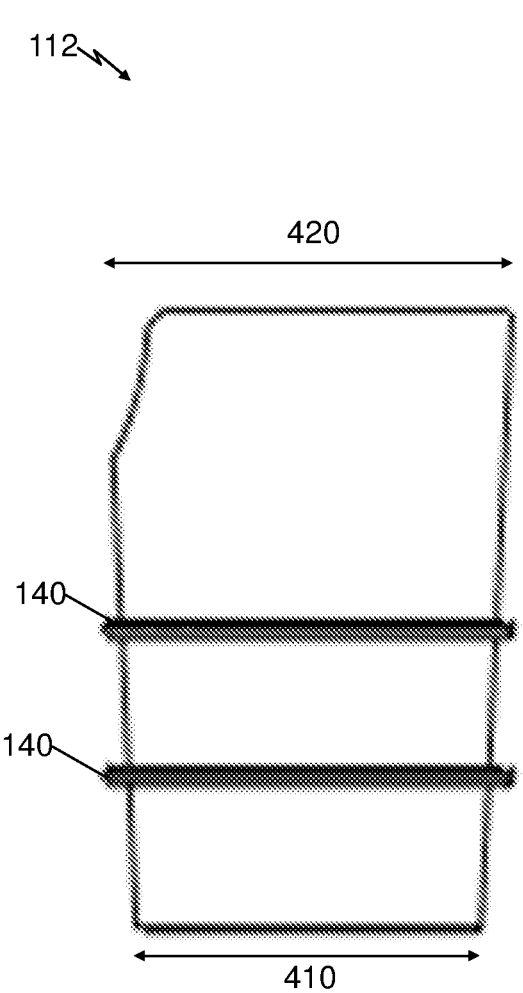
FIG. 4B shows a detailed left side view of the stopper module of lower body of the example embodiment shown in FIG. 4A.
Figure 5A:
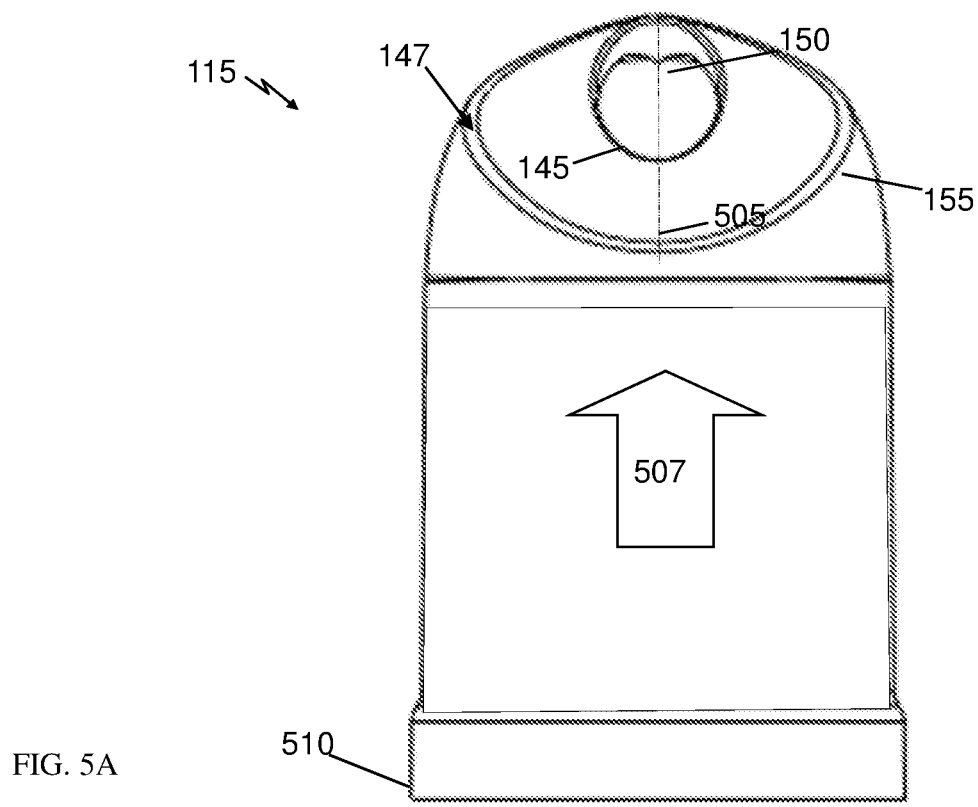
FIG. 5A shows a detailed front side view of a lid body of the example embodiment of the device shown in FIG. 1A.
Figure 5B:
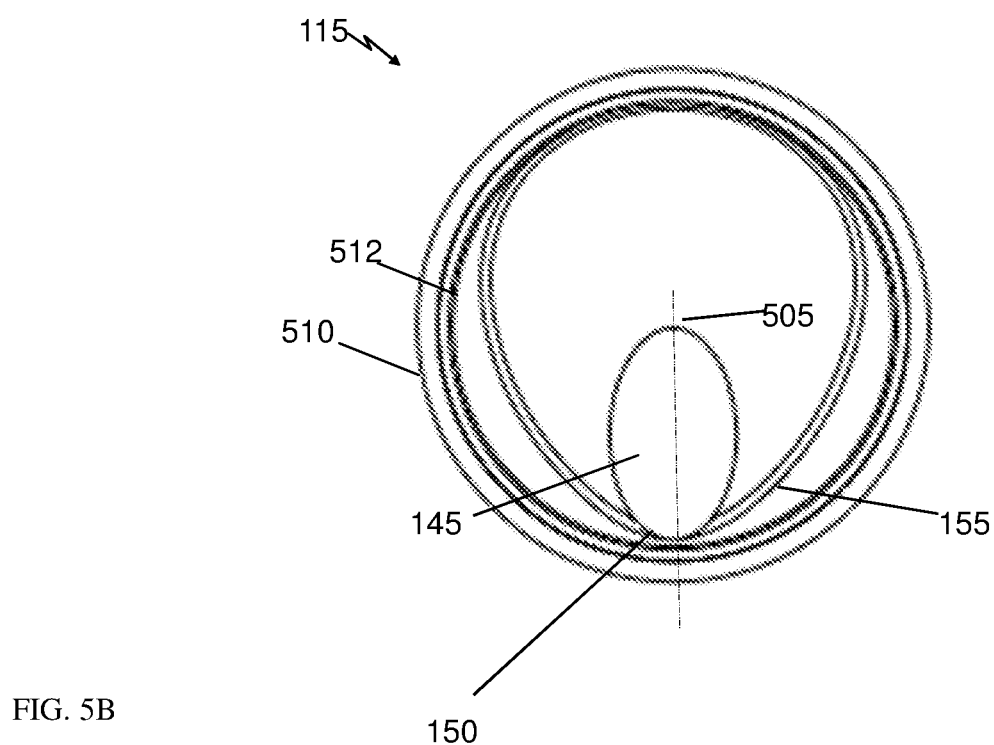
FIG. 5B shows a detailed bottom interior view of the lid body of the example embodiment shown in FIG. 5A.

However, in other embodiments, the device can further including a stopper module 112 configured to attach around the outer wall 260 of the collar 235, where the stopper module 112 is configured to form a liquid seal between the mouth and the collar 235 when the stem body 105 is inserted into the mouth 107. In some such embodiments, the stopper module 112 can have a smaller outer diameter 410 at the lower end of the stopper module 112 (the end most proximate to the interior of the container 110) and larger outer diameter 420 at the upper end of the stopper module (the end most distal to the interior of the container 110). As illustrated in FIGS. 4A-4B, to facilitate fitting into a variety of different diameter mouths 107, the stopper module 112 can be gradually tapered from its larger top outer diameter 420 to its smaller lower outer diameter 410. In some such embodiments, the stopper module 112 includes one or more ribs 140 encircling the stopper module 112.

For any such embodiments of the device 100, the connection end 162 of the lid body 115 can include an interior ridge section 510, and, the cap region 240 can include a rim 310 insertable into the ridge section 510 to abut against an interior lip 512 of the ridge section 510 and thereby form the coupling between the cap region 240 and the connection end 162. In some such embodiments, the coupling between the interior ridge section 510 and an insertion zone 320 of the rim 310 can include an ultrasonic weld, a heat weld, a silicone or epoxy adhesive, a compression snap fit, a gasket o-ring seal, a threaded connection or combination thereof.

For any such embodiments of the device 100, the connection end 162 of the lid body 115 can includes an interior ridge section 510 that forms a liquid-tight seal with the cartridge 210 such that the beverage 117 does not bypass the cartridge 210 when being poured out of the device 100 (e.g., as part of the beverage the filtration process).

For any such device 100 embodiments, the opening 145 in the top end 147 of the lid body 115 is elliptically shaped with a major axis 505 of the ellipse 505 being parallel to a direction 507 that the beverage 117 is poured out of through the device 100. In some device 100 embodiments, the opening 145 in the top end 147 of the lid body 115 includes a lip 152 located on a portion of an outer perimeter 155 of the top end 147. For some such embodiments, the lip 152 overlays about 1 to 20 percent of the total length of the top end 147 perimeter 155.

In any device 100 embodiments, for a 1.0 volume unit of beverage 117 stored in the beverage container 110, a volume of an ion exchange resin material in the filter cartridge 210 can be in a range from 0.02 to 0.07 volume units.

For any such embodiments of the device 100, the filter cartridge 210 can include a barrel wall 251 and flanges 256 coupling a filter fabric to ends 252, 254 of the filter cartridge 210 to contain an ion exchange resin material therein. In some such embodiments, a mesh size of the filter fabric is in a range from about 5 microns to 100 microns.

EXAMPLES

We describe below an embodiment of the filtration device 100 as used to treat a 25 oz (739 ml) bottle of wine.

Resin particles such as described in Meadows ranged in size (diameter) from 100-250 microns were loaded into a cartridge 210 to provide a 30 ml volume of particles. An air tube extension 215 of 7.25 inches in length 220 and 0.25 inches in diameter 225 was attached to the stem body 105. The housing 123 of the stem body defining the air vent opening 124 had a channel length 237 of 0.35 inches and the air vent opening had a diameter 238 of about 0.25 inches. The reservoir space 245 volume equaled about 5 ml. The elliptical shaped lid opening 145 had a long axis length of about 0.5 inches and short axis length of about 0.3 inches. The wine was poured out of the device 100 at a rate of about 15 ml/sec. The percentage reduction in the noxious elements, i.e., preservatives, biogenic amines and oxidized components, in the filtered wine as compared to the unfiltered wine was at least about 25 percent.

FIGS. 6A-10 present photographs of component prototypes of the beverage filtration device 100.

Figure 6A:
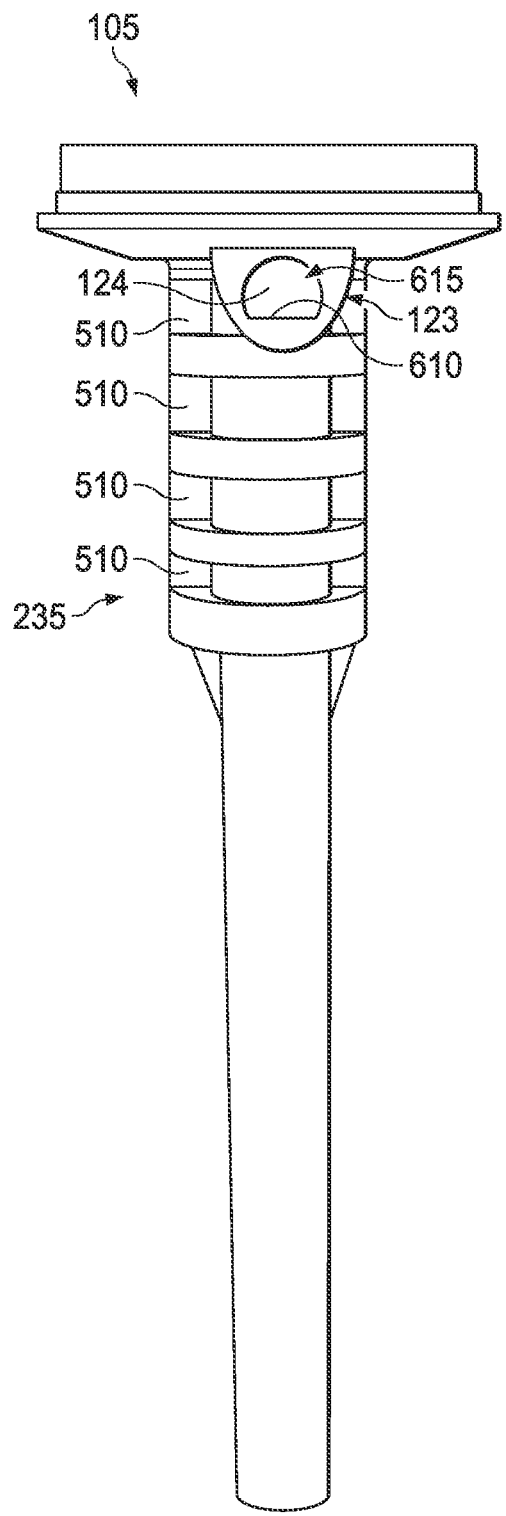
FIG. 6A shows a front side photograph of an example stem body embodiment of the beverage filtration device.
Figure 6B:
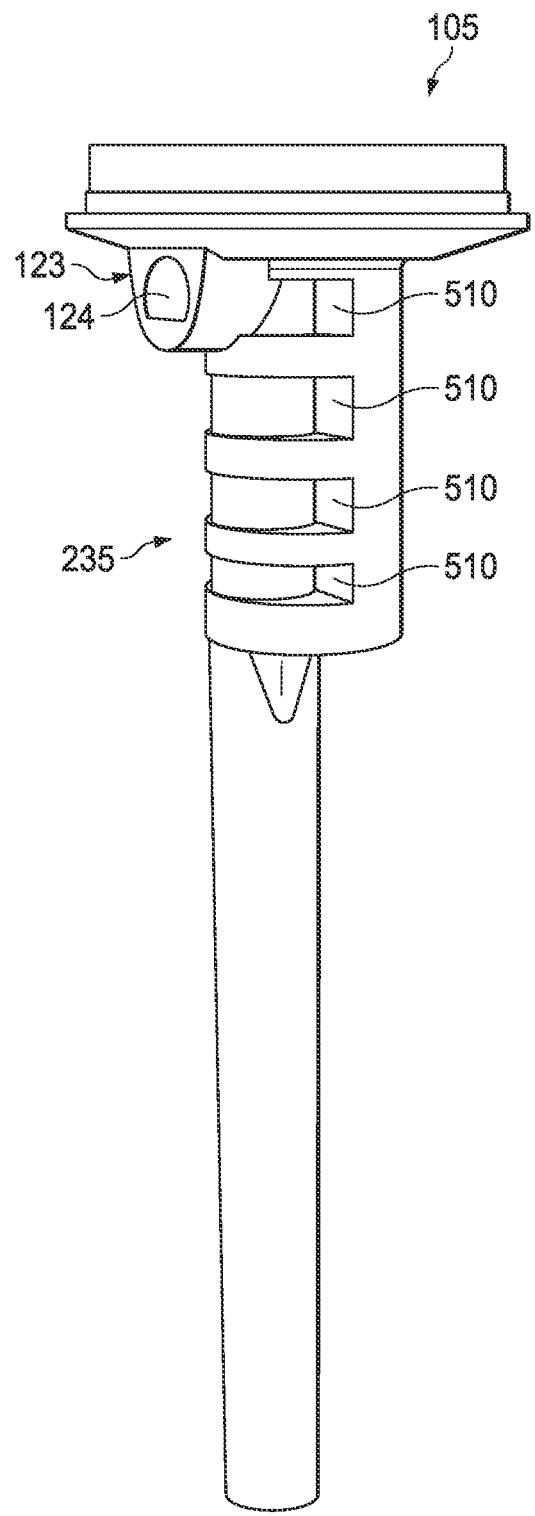
FIG. 6B shows a left side view of the example stem body shown in FIG. 6A.

With continuing reference to FIGS. 1A-5B throughout, FIG. 6A shows a front side photograph of an example stem body 105 of the device 100 and FIG. 6B shows a left side view of the example stem body 105 shown in FIG. 6A. As illustrated in FIGS. 6A-6B, the stem body collar 235 has groves 510 (similarly depicted in FIGS. 3A-3B) to improve stopper module 112 molding thereto.

Further illustrated in FIG. 6A-6B is a igloo shaped air vent housing 123 having a fan 610 to form a beverage disengagement or disentrainment zone 615 to facilitate self draining. That is, the igloo shaped air vent housing 123 has a negatively-sloped fan 610 configured help beverage entering the opening 124 and accumulating in the zone 615 and on the fan 610 to drain back down the stem body air tube 230 and air tube extender 215 and into the container 110.

Figure 7:
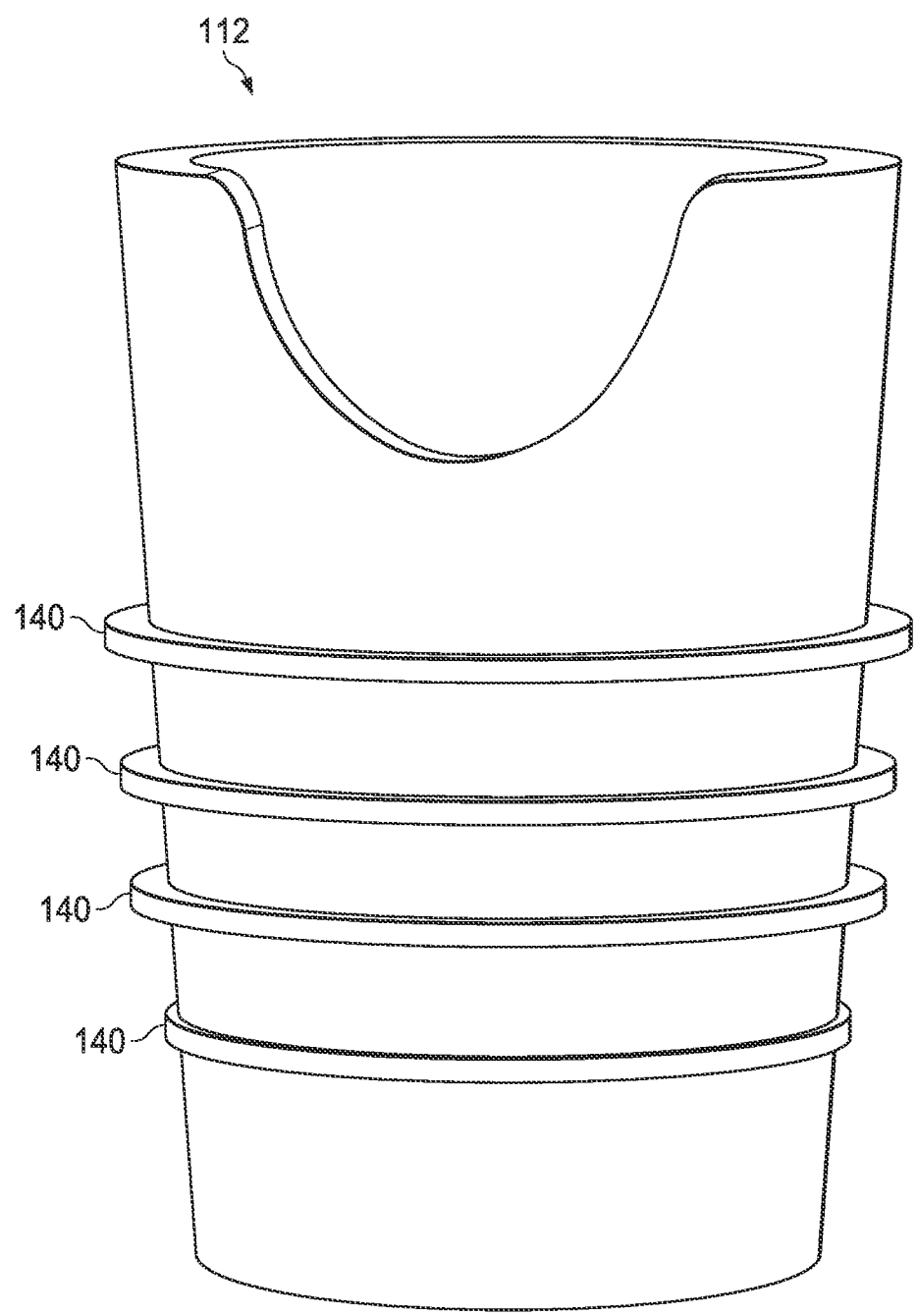
FIG. 7 shows a front side photograph of an example stopper module embodiment of the beverage filtration device.

FIG. 7 shows a front side photograph of an example stopper module 112 of the device 100. The rubber stopper module 112 was made out of a soft elastomer material (e.g., durometer 50 Shore units) with four ribs 140 and was tapered such as depicted and discussed in the context of FIGS. 4A-4B, to facilitate providing a universal fit to a broad range of wine bottle containers 110 irrespective of the size of the mouth 107.

FIG. 8A shows a right side upper perspective photograph of the example stem body 105 shown in FIG. 6A. FIGS. 8B and 8C show top down photographs of the stem body 105 shown along view line BB in FIG. 8A. FIG. 8B shows a check valve assembly 805 including a containment ring 810 situated in an interior of the insertion zone 320 of the stem body 105, the ring 810 and surrounding the first opening 264 of the conduit 262 that passes through the collar 235 of the stem body 105 (see e.g., FIG. 2A-2B). FIG. 8C illustrates a valve ball 820 of the assembly 805 (e.g., a nylon ball, part no. 9P71-10, Designatronics, Inc. Hicksville, N.Y.) covering the opening 264 and surrounded by the ring 810. The ring 810 is sized to serve as a containment zone for the ball 820 and the ball 820 size was selected to plug the first opening 264. After a first dispensing (to pour beverage 117 out though the device's opening 145) and returning the container 110 to a vertical orientation (e.g., as shown in FIG. 1A) gravity causes the beverage 117 to drain towards the stem body air tube 230 to thereby form a hydrostatically pressurized container 110. Pressurization of the container 110 in turn can cause beverage to not flow out of the device 100 in a second dispensing. The ball 820 helps to prevent this pressure build up by limiting the amount of beverage 117 that can drain from the cartridge 210 back into the beverage container 110.

Figure 1B:
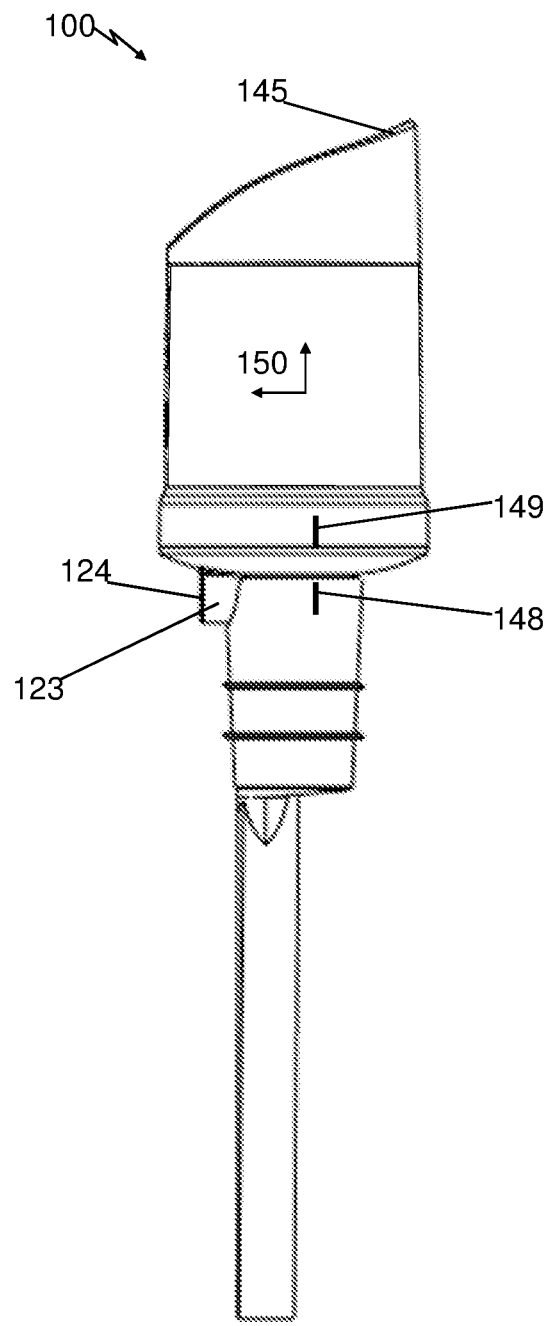
FIG. 1B shows a left side view of the example embodiment of the beverage filtration device shown in FIG. 1A.
Figure 2A:
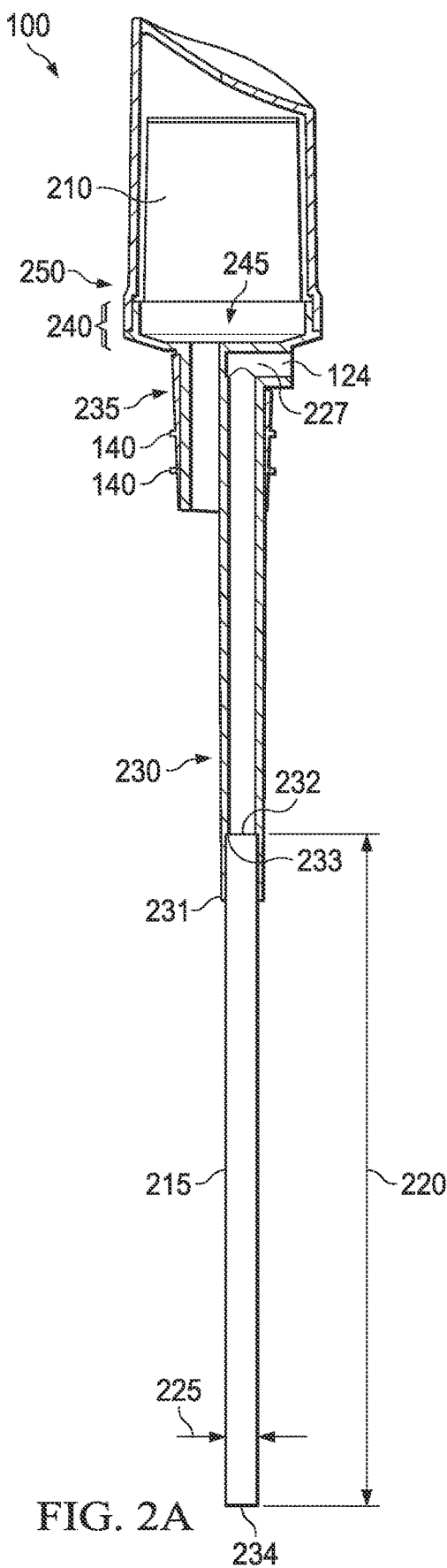
FIG. 2A shows a cross-sectional left side view of the example embodiment of the device shown in FIG. 1A.
Figure 2B:
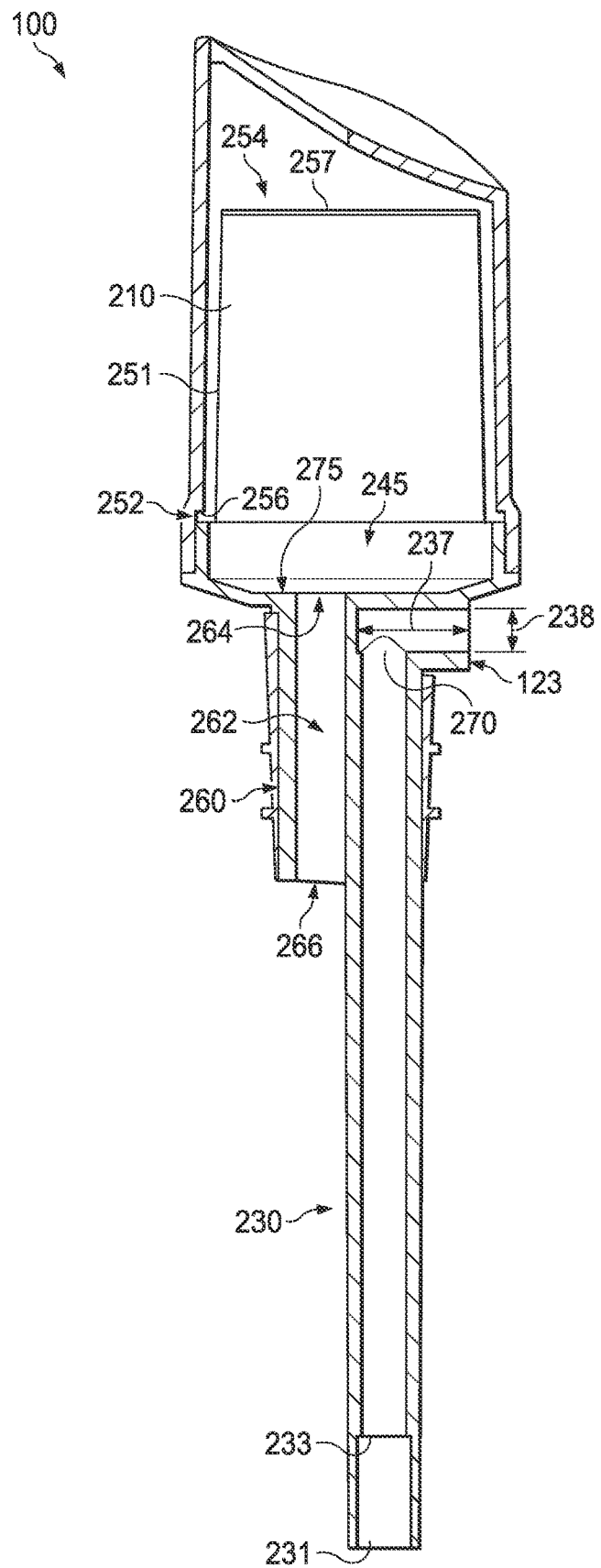
FIG. 2B shows detailed cross-sectional left side view of the example embodiment of the device shown in FIG. 1A.
Figure 3A:
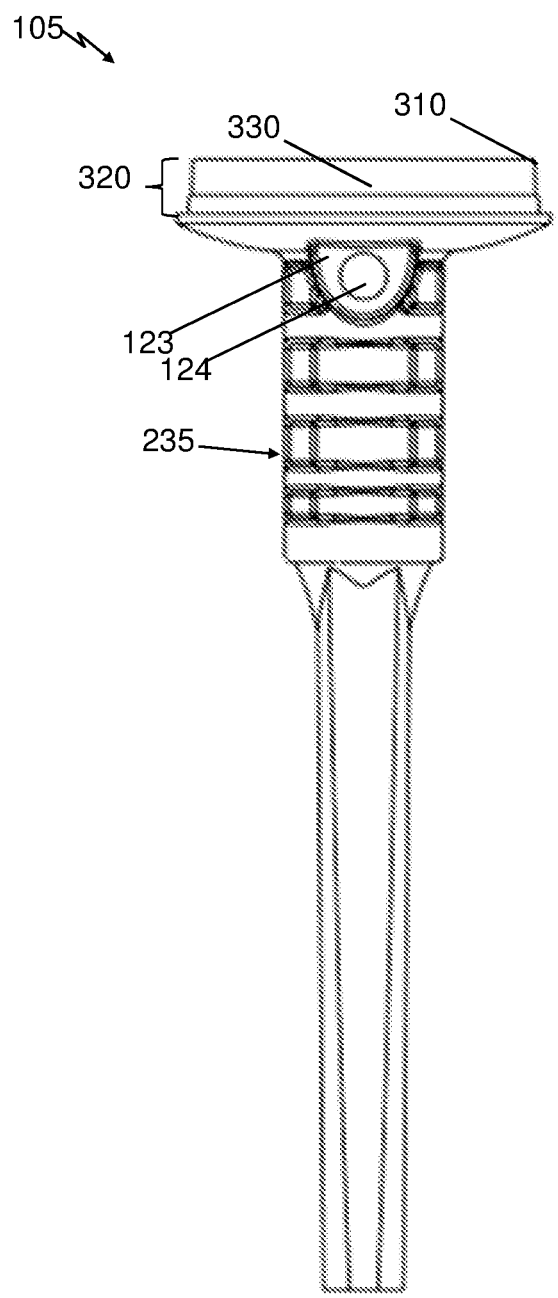
FIG. 3A shows a detailed front side view of a stem body of the example embodiment of the device shown in FIG. 1A with a stopper module of the stem body removed.
Figure 3B:
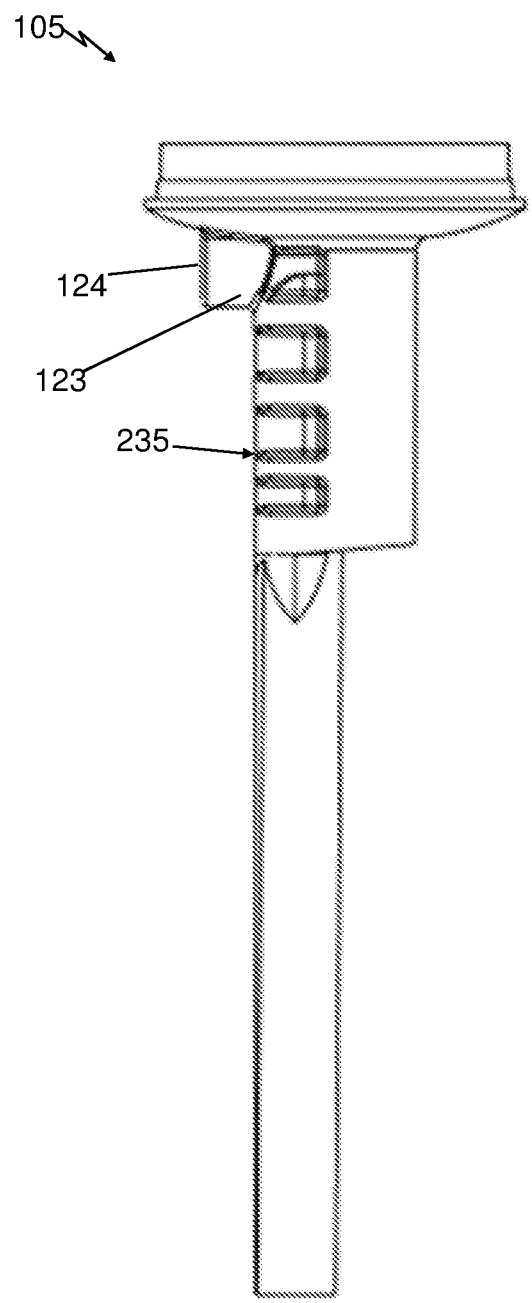
FIG. 3B shows a detailed left side view of the stem body of the example embodiment shown in FIG. 3A.
Figure 3C:
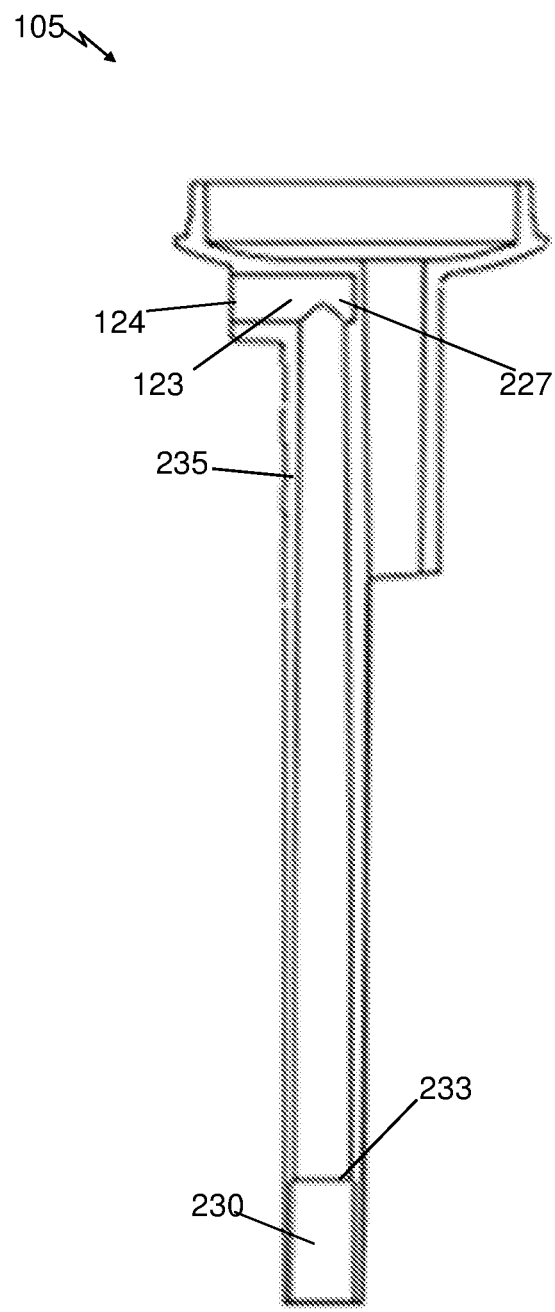
FIG. 3C shows a detailed cross-sectional left side view of the stem body of the example embodiment shown in FIG. 3A.

FIG. 9A shows a photographic view of an example embodiment of the air tube extender 215 of the device 100 and FIG. 9B shows a detailed view of a distal end 234 of the air tube extender 215 show in FIG. 9A. As discussed above in the context of FIG. 2A-2B the distal end 234 of the air tube extender 215 can be tapered. For the air tube extender 215 embodiment shown in FIG. 9A-9B, the distal end 234 was heat sealed to form a sealed tapered distal end 234. The tapered distal end 234 helps to mitigate a compression wave of beverage from coming back up from the bottom of the container 110 (e.g., from a dimpled punt region 170 such as shown in FIG. 1), through the air tube extender 215 and the stem body air tube 230, when the container 110 is set back down into a vertical orientation (e.g., FIG. 1A) after tilting the container 110 to pour beverage 117 out of the device's 100 opening 145. A beverage compression wave could undesirably result in projection or "burping" of beverage out of the air vent hole 124. However, to allow air to still vent into the container 110, one or more dampening holes 910 (e.g., two circular holes each having a diameter of about 0.25 mm on either side of the tapered distal end 234) can be made in the heat sealed-tapered distal end 234 of the air tube extender 215. The dampening holes 910 help to provide fluid mechanical dampening of the beverage compression wave to mitigate beverage projection out of the air vent hole 124. As further illustrated in FIG. 9A, an indicator mark 920 can be provided near the proximal end 232 of the air tube extender 215 to facilitate a user of the device 100 to insert the proximal end 232 a desired distance into the distal end 231 of the stem body air tube 230.

Figure 10:
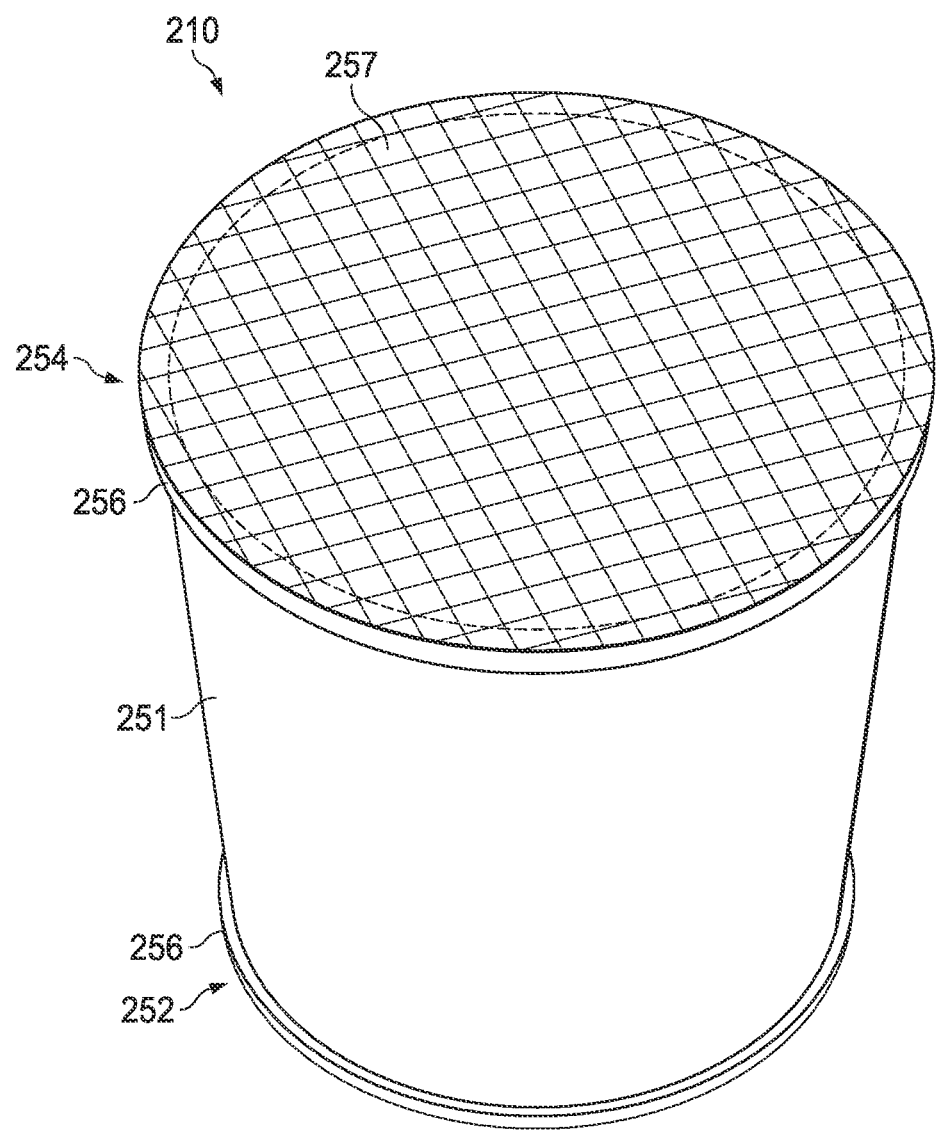
FIG. 10 shows an upper perspective view of an example cartridge embodiment to be housed inside the lid body of the device.

FIG. 10 shows an upper perspective view of a cartridge 210 to be housed inside the lid body 115 of the device 100. The plastic barrel wall 251 of the cartridge was formed by injection molding. After the outside barrel wall 251 was formed, it was filled with the ion exchange resin and porous polypropylene fabrics were welded to both the bottom and top ends 252, 254 of the cartridge 210 to hold the resin therein.

Those skilled in the art to which this application relates will appreciate that other and further additions, deletions, substitutions and modifications may be made to the described embodiments.

What is claimed is:

1. A beverage filtration device, comprising:
   a lid body having an internal housing configured to hold an ion exchange resin-filed cartridge therein, the lid body having a connection end and a top end having an opening therein; and
   a stem body, the stem body including:
      a cap region configured to couple to the connection end of the lid body to form a liquid-tight seal coupling there-between,
      a collar, wherein a first portion of a wall of the collar is sized to fit inside a mouth of a beverage container and a second portion of the wall sized to be located outside of the mouth,
      a beverage conduit spanning the collar, wherein a first opening of the conduit opens to the coupling between the cap region, the conduit extends from the coupling between the cap region and the connection end, and a second opening of the conduit opens to and is located in an interior of the beverage container and
      a stem body air tube extending through the collar, wherein:
         a proximal opening of the stem body air tube opens to an air vent hole located in the second portion of the wall of the collar, and
         a distal opening of the stem body air tube opens to the interior of the beverage container,
      wherein the second portion of the wall of the collar includes a housing that defines an air reservoir ending at the air vent hole, a long axis length of the air reservoir being perpendicularly oriented relative to a long axis length of the stem body air tube.

2. The device of claim 1, wherein the coupling between the cap region of the stem body and the connection end of the lid body form a reservoir there-between.

3. The device of claim 2, wherein the cap region of the stem body has a concave cupped shape interior surface defining a portion of the reservoir.

4. The device of claim 1, wherein the cap region of the stem body is rotationally adjustable relative to the connection end of the lid body such that an orientation of a lid opening of the lid body relative to an air vent opening of the stem body is adjustable.

5. The device of claim 1, wherein the stem body and the lid body each have alignment tabs and when the tabs are aligned with each other, an orientation of the lid opening of the lid body relative to an air vent opening has an orientation angle of about 180 degrees.

6. The device of claim 1, further including an air tube extender configured to be detachably connectable to the stem body air tube.

7. The device of claim 6, wherein for a container having an length of 1.0 arbitrary length unit, a portion of the stem body inside the container has a length in a range from about 0.2 to 0.6 arbitrary length units and the air tube extender has a length in a range from about 0.3 to 0.7 arbitrary length units, respectively.

8. The device of claim 6, wherein a distal end of the air tube extender is more distal from the lid body than the second opening of the beverage conduit.

9. The device of claim 1, further including a stopper module configured to attach around the outer wall of the collar, the stopper module configured to form a liquid seal between the mouth and the collar when the stem body is inserted into the mouth.

10. The device of claim 9, wherein the stopper module has a smaller outer diameter at the lower end of the stopper module and larger outer diameter at the upper end of the stopper module.

11. The device of claim 9, wherein the stopper module includes one or more ribs encircling the stopper module.

12. The device of claim 1, wherein the connection end of the lid body includes an interior ridge section and the cap region includes a rim insertable into the ridge section to abut against an interior lip of the ridge section to thereby form the coupling between the cap region and the connection end.

13. The device of claim 12, wherein the coupling between the interior ridge section and an insertion zone of the rim includes an ultrasonic weld, a heat weld, a silicone or epoxy adhesive, a compression snap fit, a gasket o-ring seal, a threaded connection or combination thereof.

14. The device of claim 1, wherein the connection end of the lid body includes an interior ridge section that forms a liquid-tight seal with the cartridge such that the beverage does not bypass the cartridge when being poured out of the device.

15. The device of claim 1, wherein the opening in the top end of the lid body is elliptically shaped with a major axis of the ellipse being parallel to a direction that the beverage is poured out of through the device.

16. The device of claim 1, wherein the opening in the top end of the lid body includes a lip located on a portion of an outer perimeter of the top end.

17. The device of claim 16, wherein the lip overlays about 1 to 20 percent of the total length of the top end perimeter.

18. The device of claim 1, wherein for a 1.0 volume unit of beverage stored in the beverage container, a volume of an ion exchange resin material in the filter cartridge is in a range from 0.02 to 0.07 volume units.

19. The device of claim 1, wherein the filter cartridge includes a barrel wall and flanges coupling a filter fabric to ends of the filter cartridge to contain an ion exchange resin material therein.

20. The device of claim 19, wherein a mesh size of the filter fabric is in a range from about 5 microns to 100 microns.

21. The device of claim 1, wherein the beverage conduit and stem body air tube separately extend through the collar.

22. A beverage filtration device, comprising:
a lid body having an internal housing configured to hold an ion exchange resin-filed cartridge therein, the lid body having a connection end and a top end having an opening therein; and
a stem body, the stem body including:
a cap region configured to couple to the connection end of the lid body to form a liquid-tight seal coupling there-between,
a collar, wherein a first portion of a wall of the collar is sized to fit inside a mouth of a beverage container and a second portion of the wall sized to be located outside of the mouth,
a beverage conduit spanning the collar, wherein a first opening of the conduit opens to the coupling between the cap region, the conduit extends from the coupling between the cap region and the connection end, and a second opening of the conduit opens to and is located in an interior of the beverage container and
a stem body air tube extending through the collar, wherein:
a proximal opening of the stem body air tube opens to an air vent hole located in the second portion of the wall of the collar, and
a distal opening of the stem body air tube opens to the interior of the beverage container,
wherein the second portion of the wall of the collar includes a housing that defines an air reservoir ending at the air vent hole, wherein the air vent hole is shaped as circular opening with a minor segment removed.

23. A beverage filtration device, comprising:
a lid body having an internal housing configured to hold an ion exchange resin-filed cartridge therein, the lid body having a connection end and a top end having an opening therein; and
a stem body, the stem body including:
a cap region configured to couple to the connection end of the lid body to form a liquid-tight seal coupling there-between,
a collar, wherein a first portion of a wall of the collar is sized to fit inside a mouth of a beverage container and a second portion of the wall sized to be located outside of the mouth,
a beverage conduit spanning the collar, wherein a first opening of the conduit opens to the coupling between the cap region, the conduit extends from the coupling between the cap region, and the connection end, and a second opening of the conduit opens to and is located in an interior of the beverage container and
a stem body air tube extending through the collar, wherein:
a proximal opening of the stem body air tube opens to an air vent hole located in the second portion of the wall of the collar, and
a distal opening of the stem body air tube opens to the interior of the beverage container, wherein the second portion of the wall of the collar includes a housing that defines an air reservoir ending at the air vent hole, the housing has an interior surface that negatively slopes from the air vent hole towards a proximal opening of the stem body air tube to thereby drain portions of a beverage into the stem body air tube after pouring the beverage from the opening in the lid body and returning the device to an upright position.

* * * * *